(12) United States Patent
Ford

(10) Patent No.: US 7,174,858 B2
(45) Date of Patent: Feb. 13, 2007

(54) HORSE BOOT SLEEVE FOR PASTERN PROTECTION

(76) Inventor: Garrett N. Ford, 2300 E. Vistoso Commerce Loop Rd., Tucson, AZ (US) 85737

( * ) Notice: Subject to any disclaimer, the term of this patent is extended or adjusted under 35 U.S.C. 154(b) by 6 days.

(21) Appl. No.: 10/910,977

(22) Filed: Aug. 4, 2004

(65) Prior Publication Data

US 2005/0166556 A1 Aug. 4, 2005

Related U.S. Application Data

(63) Continuation-in-part of application No. 10/755,945, filed on Jan. 13, 2004.

(51) Int. Cl.
*A01K 29/00* (2006.01)
(52) U.S. Cl. .......................... 119/850; 54/82
(58) Field of Classification Search ............... 119/850; 54/82; 36/111; D30/146
See application file for complete search history.

(56) References Cited

U.S. PATENT DOCUMENTS

| D223,369 | S | * | 4/1972 | Jackson | D30/146 |
| 3,794,119 | A | * | 2/1974 | Paiso et al. | 168/18 |
| D267,750 | S | * | 1/1983 | Norstrom | D30/146 |
| 5,174,382 | A | * | 12/1992 | Wright | 168/28 |
| 5,224,549 | A | * | 7/1993 | Lightner | 168/18 |
| 5,715,661 | A | * | 2/1998 | Meyers | 54/82 |
| 6,062,008 | A | * | 5/2000 | Nor | 54/82 |
| 6,305,238 | B1 | * | 10/2001 | Gabas | 74/502.6 |
| 6,546,704 | B1 | * | 4/2003 | Fisher | 54/82 |
| 6,560,951 | B1 | * | 5/2003 | Wood | 54/82 |
| 6,651,410 | B2 | * | 11/2003 | Osha et al. | 54/82 |
| 6,662,537 | B1 | * | 12/2003 | Wilson | 54/82 |
| 6,694,713 | B1 | * | 2/2004 | MacDonald | 54/82 |
| 6,868,656 | B2 | * | 3/2005 | Osha et al. | 54/82 |

* cited by examiner

*Primary Examiner*—Peter M. Poon
*Assistant Examiner*—John D. Holman
(74) *Attorney, Agent, or Firm*—Antonio R. Durando

(57) ABSTRACT

A protective sleeve is provided for use with a low-profile boot to provide a resilient layer that prevents penetration of debris accumulated at the interface of the boot with the pastern of the horse, especially at the rear of the hoof. The form of the sleeve is tailored so that it conforms to the natural shape of a typical hoof and pastern without creases or other unnecessary accumulations of material that might provide discomfort to the horse. The lower portion of the sleeve is adapted to wrap around and cover the heel bulb, but not the rest of the hoof, in order to retain the ease with which the boot is put on the hoof of the horse. The lower portion of the sleeve is designed to wrap around the pastern and overlap for fastening with a loop-and-hook strap. Also, a retaining flap disposed upon the protective sleeve and located between the horse's hoof and the interior of its boot allows the sleeve to more securely stay in place around the animal's hoof and pastern during movement.

14 Claims, 3 Drawing Sheets

HORSE BOOT SLEEVE FOR PASTERN PROTECTION

REFERENCE TO RELATED APPLICATIONS

This application is a continuation-in-part of U.S. patent application Ser. No. 10/755,945, filed on Jan. 13, 2004, by the same inventor.

BACKGROUND OF THE INVENTION

1. Field of the Invention

The invention relates in general to articles of footwear for animals and, in particular, to a protective sleeve for a horse boot.

2. Description of the Prior Art

Horse boots are used to protect the hooves and fetlocks of horses and are sometimes used in lieu of horseshoes. A horse boot typically includes a sole with opposed flat major surfaces and an upper which projects from one of the major surfaces and forms an enclosure for the hoof, the pastern, and sometimes the fetlock of a horse. The upper typically extends along the rim of the sole and has an edge which is secured to the sole. The upper has a second edge remote from the sole, and such edge is provided with a cuff which can be tightened around the hoof, pastern and fetlock of the horse.

The upper and cuff are spread in order to put the boot on the hoof of the horse. After spreading the upper and the cuff, the boot is slid over the hoof and the cuff is tightened around the pastern or fetlock, depending on the height of the boot, to secure the boot in place.

A recent advance in the art lies in a horse boot that is characterized by an upper and a cuff designed to fit over the hoof and wrap tightly over the hairline portion of the pastern without extending upwardly through the pastern and over the fetlock. Such a boot is illustrated in FIG. 1. This configuration provides more freedom of movement without diminishing the protection afforded to the hoof and heel bulb. It also prevents the irritation to the fetlock often associated with higher boots that extend over it. Moreover, the boot of FIG. 1, by virtue of being secured in place by fastening the cuff tightly around the hairline portion of the pastern, which is smaller than the hoof below, provides a very stable form of attachment that minimizes rubbing and still prevents the loss of the boot by the horse.

Because of the lower profile of the boot 10 of FIG. 1, a problem may still develop during use if sand or other small debris accumulates at the interface of the cuff portions 12a,12b,12c with the hairline region HL of the pastern 32. Penetration of such sand or debris into the boot and the subsequent rubbing against the heel bulb of the hoof, a particularly sensitive area, may cause irritation and discomfort to the horse, who may then try to jettison the boot. Therefore, this invention is directed at providing a solution to this potential problem.

SUMMARY OF THE INVENTION

The invention includes a protective sleeve intended for use with a boot of the type illustrated in FIG. 1 to provide a resilient layer that prevents penetration of debris accumulated at the interface of the boot with the pastern of the horse, especially at the rear of the hoof. The form of the sleeve is tailored so that it conforms to the natural shape of a typical hoof and pastern without creases or other unnecessary accumulations of material that might provide discomfort to the horse. The lower portion of the sleeve is adapted to wrap around and cover the heel bulb, but not the rest of the hoof, in order to retain the ease with which the boot is put on the hoof of the horse. The upper portion of the sleeve is designed to wrap around the pastern and overlap for fastening with a loop-and-hook strap. The material is selected to be sufficiently resilient and thick to ensure that at no time during use a gap is formed between the boot and the pastern or hoof, so that accumulated sand and the like cannot fall into the boot and rub against the hoof. Moreover, a second embodiment of the invention features a retaining flap disposed upon the sleeve such that the flap is located between the animal's hoof and its boot, thereby keeping the sleeve securely in place.

Additional features and advantages of the invention will be forthcoming from the following detailed description of certain specific embodiments when read in conjunction with the accompanying drawings.

DESCRIPTION OF THE PREFERRED EMBODIMENTS

Figure 2:
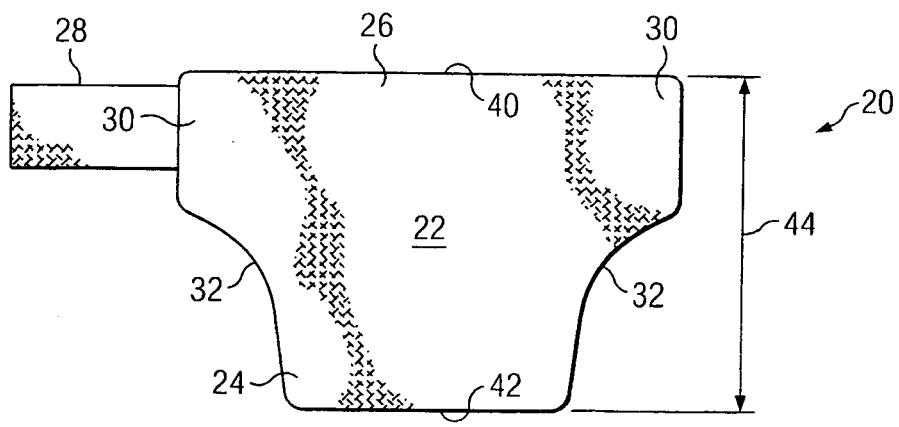
FIG. 2 is a plan view of a protective sleeve according to the invention.

For the purposes of this disclosure, the term resilient is used to refer to a material that is both stretchable and compressible, and is capable of recovering its size and shape after deformation caused by compressive as well as tensile stresses. Referring to FIG. 2, the protective sleeve 20 of the invention consists of a pad 22 of resilient material that includes a lower portion 24 designed to wrap around the heel bulb HB of the hoof H of a horse from the bottom to the top of the hoof, as shown in the FIG. 3. The front of the hoof is left open, so that it may be more easily introduced into the boot 10, or a similar boot that is designed to fasten by wrapping around the pastern P above the hairline HL but below the fetlock F.

Figure 3:
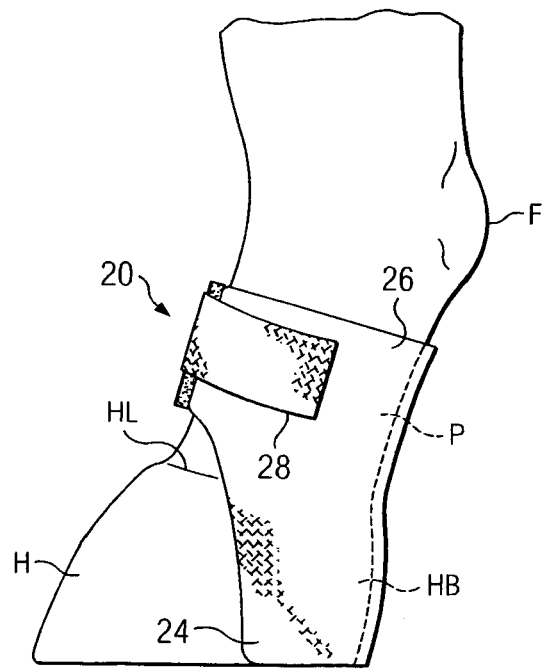
FIG. 3 is a perspective view of the sleeve of FIG. 2 wrapped around the hoof and pastern of a horse prior to wearing a boot of the type illustrated in FIG. 1.

The upper portion 26 of the sleeve 20 is instead sufficiently wide to wrap around the pastern P for fastening of the sleeve on the leg of the horse, preferably by means of a hook-and-loop device partly incorporated into a laterally extending strap 28. The upper portion 26 should not be tall enough to reach the fetlock F of the horse, thereby avoiding any possibility of rubbing against it during use, which is a common source of irritation from tall boots used in the art. The height of the lateral bands 30 (which define the height of the upper portion 26) and the precise shape of the curved cuts 32 joining the lower and upper portions of the sleeve are selected so that the front sides of the hoof and hairline are left uncovered, as illustrated in FIG. 3. On the other hand, the bands 30 should be sufficiently high to be overlapped by the tongue 14 in the front of the boot 10 when it is worn by the horse.

Figure 4:
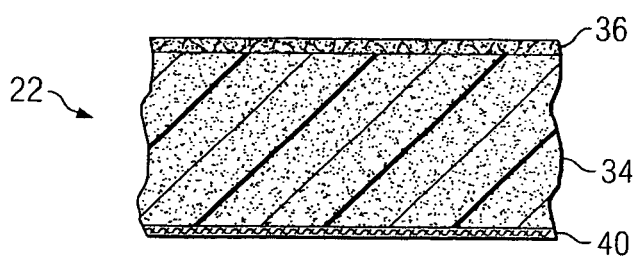
FIG. 4 is a sectioned view of the various layers constituting the preferred embodiment of the resilient material of the invention.

The material used for the resilient pad 22 of the invention needs to be not only resilient but also sufficiently thick to avoid the formation of gaps between the boot and the pastern or hoof of the horse during use. In the preferred embodiment, the material consists of Neoprene® about one quarter of an inch thick, which proved to be very durable and suitable to prevent penetration of debris and avoid irritation. As illustrated in FIG. 4, the layer 34 of resilient material is preferably combined with an outer sheet 36 of loop material which can be used to provide a fastening anchor to a strap 28 that bears hook material on its underside. An inner layer 40 of fabric material is also preferably adhered to the Neoprene to provide protection against wear. The product commonly referred to as nylon jersey is preferred for this purpose.

In the preferred embodiment, which is believed to be appropriate to conform advantageously to the dimensions of most horse hooves and pasterns, the sleeve of the invention has substantially straight top and bottom edges 40,42 about 10 and 5 inches wide, respectively, and an overall height 44 of about six inches. The bands 30 are about two inches tall (thereby defining upper and lower portions 26,24 about two and four inched tall, respectively) and the curvature of the cuts 32 connecting the bands 30 to the bottom edge 42 is progressively more marked towards the top, as illustrated in FIG. 2.

Figure 1:
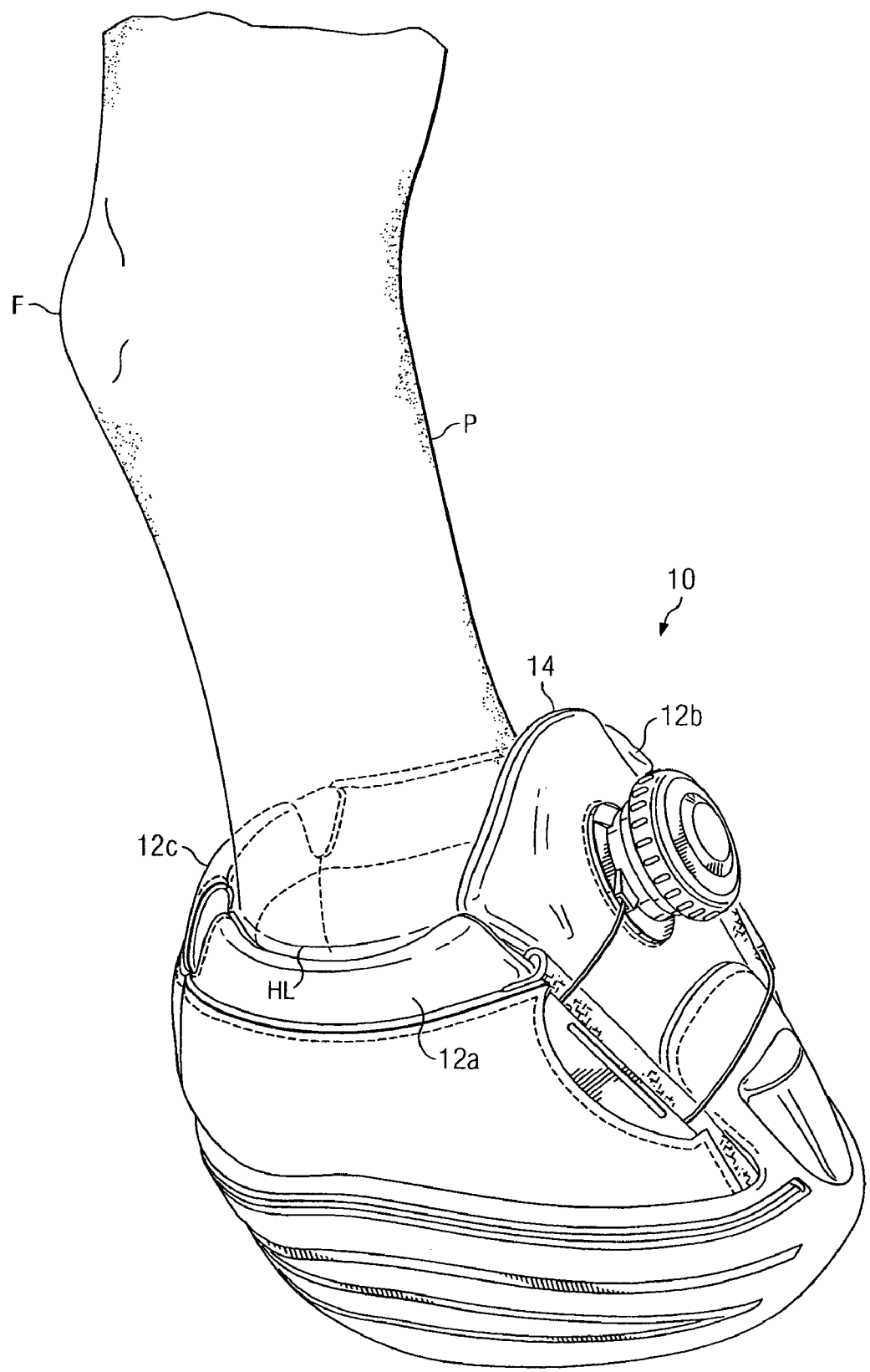
FIG. 1 is a perspective view of a boot of the type intended for use with the protective sleeve of the present invention, including the bottom portion of the leg of a horse and the hoof inserted in the boot.
Figure 5:
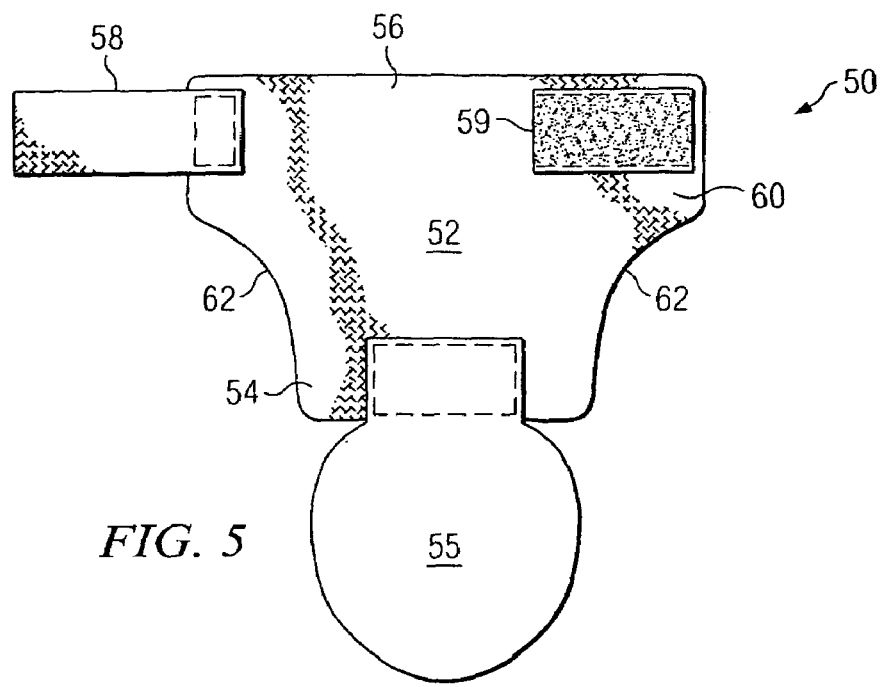
FIG. 5 is a plan view of a second embodiment of the invention that features a retaining flap.

Turning to FIG. 5, a second embodiment of the protective sleeve 50 is shown. The protective sleeve 50 features a pad 52 of resilient material that includes a lower portion 54 designed to wrap around the heel bulb HB of the hoof H of a horse from the bottom to the top of the hoof, as shown in the FIG. 6. The front of the hoof is left open, so that it may be more easily introduced into the boot 10 of FIG. 1, or a similar boot that is designed to fasten by wrapping around the pastern P above the hairline HL but below the fetlock F. A retaining flap 55 is coupled with the pad 52 (in this case on lower portion 54) such that the flap 55 may be positioned for location under the horse's hoof (see FIG. 6). Ideally, the flap 55 is approximately the size of the horse's hoof; however, the flap may be smaller with acceptable results. Because the horse's weight "anchors" the retaining flap 55 underfoot HU, the sleeve 50 will more securely stay in place around the animal's hoof and pastern during movement.

Figure 6:
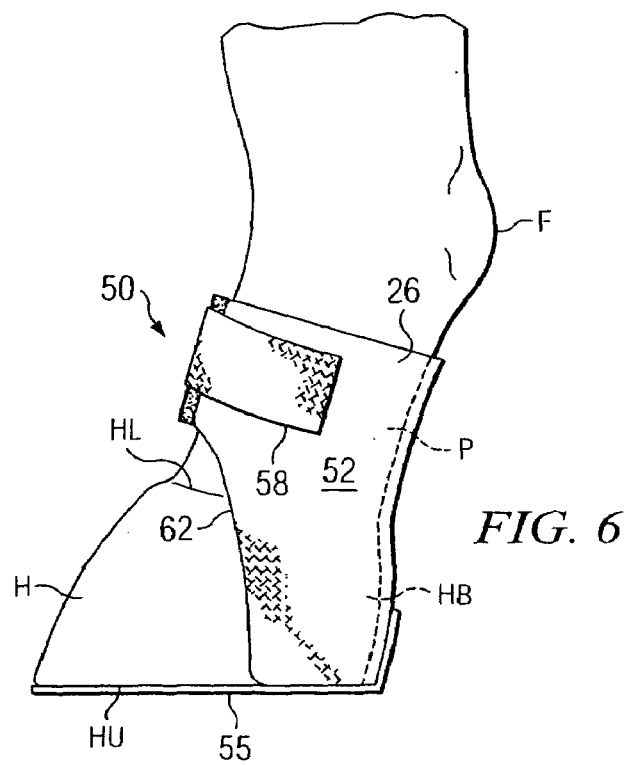
FIG. 6 is a elevational side-view of the sleeve of FIG. 5 wrapped around the hoof and pastern of a horse (shown in phantom line) prior to the fitting of a boot of the type illustrated in FIG. 1.

The upper portion 56 of the sleeve 50 is sufficiently wide to wrap around the pastern P for fastening of the sleeve on the leg of the horse, preferably by means of a hook-and-loop device partly incorporated into a laterally extending strap 58 and fastening surface 59. The upper portion 56 should not be tall enough to reach the fetlock F of the horse, thereby avoiding any possibility of rubbing against it during use, which is a common source of irritation from tall boots used in the art. The height of the lateral bands 60 (which define the height of the upper portion 56) and the precise shape of the curved cuts 62 joining the lower and upper portions of the sleeve are selected so that the front sides of the hoof and hairline are left uncovered, as illustrated in FIG. 6.

While the invention has been shown and described herein with reference to what are believed to be the most practical embodiments, it is recognized that departures can be made within the scope of the invention and, therefore, the invention is not to be limited to the details disclosed herein but is to be accorded the full scope of equivalent articles.

I claim:

1. A protective sleeve for use with a horse boot that includes a support for bearing against a hoof of a horse and an enclosure for enclosing the hoof of the horse, comprising:
   (a) a pad of resilient material having a bottom portion for covering a heel bulb in the hoof of the horse and a top portion with two lateral bands for wrapping around a pastern of the horse;
   (b) means for fastening the lateral bands to one another over the pastern of the horse; and
   (c) a retaining flap coupled to the pad such that the flap is located entirely between an underside of the horse's hoof and an interior of the boot;
   wherein said top portion of the pad is sufficiently wide to completely wrap around the pastern of the horse, said bottom portion of the pad is sufficiently wide to wrap round a portion of the hoof which includes the heel bulb and the pad is designed to be spaced from a front edge of the hoof by a distance sufficiently large that a hairline of the hoof is exposed; and
   whereby a gap is prevented from forming between said enclosure of the boot and the pastern of the horse during use of the boot.

2. The protective sleeve of claim 1, wherein said fastening means consists of a hook-and-loop mechanism.

3. The protective sleeve of claim 2, wherein the hook-and-loop mechanism includes an outer layer of loop material attached to the pad and a strap attached to the upper portion of the pad, said strap containing hook material.

4. The protective sleeve of claim 3, further including an inner layer of fabric attached to the pad.

5. The protective sleeve of claim 1, wherein said pad is about 6 inches high, said top portion of the pad is about 2 inches tall and about 10 inches wide, said bottom portion is about 4 inches tall and has a width tapering from about 10 inches at the top to about 5 inches at the bottom with a progressively decreasing curvature.

6. The protective sleeve of claim 3, wherein said pad is about 6 inches high, said top portion of the pad is about 2 inches tall and about 10 inches wide, said bottom portion is about 4 inches tall and has a width tapering from about 10 inches at the top to about 5 inches at the bottom with a progressively decreasing curvature.

7. A protective-sleeve/horse-boot combination comprising:
   (a) a horse boot including a support for bearing against a hoof of a horse and against the ground, and an enclosure for enclosing the hoof of the horse;
   (b) a pad of resilient material in the horse boot, the pad having a bottom portion for covering a heel bulb in the hoof of the horse and a top portion with two lateral bands for wrapping around a pastern of the horse;
   (c) means for fastening the two lateral bands to one another over the pastern of the horse; and
   (d) a retaining flap coupled to the pad such that the flap is located between the horse's hoof and an interior of the boot;
   wherein said top portion of the pad is sufficiently wide to completely wrap around the pastern of the horse, said bottom portion of the pad is sufficiently wide to wrap around a portion of the hoof which includes the heel bulb and the pad is designed to be spaced from a front edge of the hoof by a distance sufficiently large that a hairline of the hoof is exposed;
   whereby a gap is prevented from forming between said enclosure of the boot and the pastern of the horse during use of the boot.

8. The protective sleeve of claim 7, wherein said fastening means consists of a book-and-loop mechanism.

9. The protective sleeve of claim 8, wherein the hook-and-loop mechanism includes an outer layer of loop material attached to the pad and a strap attached to the upper portion of the pad, said strap containing hook material.

10. The protective sleeve of claim 9, further including an inner layer of fabric attached to the pad.

11. The protective sleeve of claim 10, wherein said pad is about 6 inches high, said top portion of the pad is about 2 inches tall and about 10 inches wide, said bottom portion is about 4 inches tall and has a width tapering from about 10 inches at the top to about 5 inches at the bottom with a progressively decreasing curvature.

12. The protective sleeve of claim 7, wherein said pad is about 6 inches high, said top portion of the pad is about 2 inches tall and about 10 inches wide, said bottom portion is about 4 inches tail and has a width tapering from about 10 inches at the top to about 5 inches at the bottom with a progressively decreasing curvature.

13. The protective sleeve of claim 1, wherein the pad is designed to be spaced from the front edge of the hoof by a minimum of about one-half the length of the hoof.

14. The combination of claim 7, wherein the pad is designed to be spaced from the front edge of the hoof by a minimum of about one-half the length of the hoof.

* * * * *